United States Patent
Verhaeghe et al.

(10) Patent No.: US 10,292,335 B2
(45) Date of Patent: May 21, 2019

(54) SIGNAL PROCESSING METHOD OF A BALE CHAMBER LOAD SIGNAL

(71) Applicant: CNH Industrial America LLC, New Holland, PA (US)

(72) Inventors: Didier Verhaeghe, Ypres (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/895,434

(22) PCT Filed: Jun. 3, 2014

(86) PCT No.: PCT/EP2014/061466
§ 371 (c)(1),
(2) Date: Dec. 2, 2015

(87) PCT Pub. No.: WO2014/195302
PCT Pub. Date: Dec. 11, 2014

(65) Prior Publication Data
US 2016/0113205 A1 Apr. 28, 2016

(30) Foreign Application Priority Data
Jun. 3, 2013 (BE) .................... 2013/0389

(51) Int. Cl.
*A01F 15/08* (2006.01)
*G05B 15/02* (2006.01)
(52) U.S. Cl.
CPC .......... *A01F 15/0825* (2013.01); *G05B 15/02* (2013.01)

(58) Field of Classification Search
CPC .............. A01F 15/042; A01F 15/046; A01F 2015/0795; A01F 15/0825; G05B 15/02
See application file for complete search history.

(56) References Cited

U.S. PATENT DOCUMENTS

| 4,624,180 A | 11/1986 | Strosser |
| 6,026,741 A | 2/2000 | Lippens et al. |
| 8,116,072 B2* | 2/2012 | Kagan .................. G01R 22/065 361/659 |
| 8,393,137 B1* | 3/2013 | Crosby .................. A01D 91/04 56/341 |
| 2011/0023731 A1* | 2/2011 | Matousek ........... A01F 15/0825 100/35 |
| 2012/0000377 A1* | 1/2012 | Verhaeghe .......... A01F 15/0825 100/45 |
| 2012/0186466 A1* | 7/2012 | Vande Ryse ........ A01F 15/0825 100/43 |
| 2013/0042770 A1* | 2/2013 | Verhaeghe .......... A01F 15/0825 100/35 |

FOREIGN PATENT DOCUMENTS

EP 0346586 A2 12/1989

* cited by examiner

*Primary Examiner* — Jerrah Edwards
*Assistant Examiner* — Mathew Franklin Gordon
(74) *Attorney, Agent, or Firm* — Patrick M. Sheldrake; Peter K. Zacharias

(57) ABSTRACT

A signal processing method of a baler system includes the steps of receiving a signal, determining a steady state level and relating the steady state level to a characteristic of a forming bale. A signal is received from at least one sensor associated with a bale chamber of the baler system and a steady state level is determined from the signal. The steady state level of the signal is related to a characteristic of the forming bale in the bale chamber.

20 Claims, 5 Drawing Sheets

SIGNAL PROCESSING METHOD OF A BALE CHAMBER LOAD SIGNAL

This application is the US National Stage filing of International Application Serial No. PCT/EP2014/061466 filed on Jun. 3, 2014 which claims priority to Belgian Application BE2013/0389 filed Jun. 3, 2013, each of which is incorporated herein by reference in its entirety.

FIELD OF THE INVENTION

The present invention relates to a signal processing method of an agricultural baler, and, more particularly, to a signal processing method of a load measured in the bale chamber of an agricultural baler.

DESCRIPTION OF THE RELATED ART

Agricultural balers are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which may chop the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, after the wad is injected into the bale chamber, the plunger compresses the wad of crop material into a flake against previously formed flakes to form a bale and, at the same time, gradually advances the bale toward the outlet of the bale chamber. Pressure exerted by the walls of the bale chamber dictates the frictional force required to overcome static friction and shift the flakes in the chamber. An increased force to shift the flakes causes the plunger to compact the flakes tighter, to thereby produce a higher density bale.

The bale chamber typically has three moving walls (the top and two sides), which may be positioned by two hydraulically controlled actuators connected to a cam mechanism. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

As the bale is being formed a sensor associated with the drive train of the plunger is used to determine the loads encountered by the plunger to estimate the density of the bale. Such a baler is shown in e.g. U.S. Pat. No. 4,624,180 or in EP 0.346.586. This approach has limited precision for many reasons, for example, due to tolerance in the alignment of the gearbox driving the plunger and the losses in the drive train. Another reason is that the varying size of the wads can alter the information from such a sensor. In U.S. Pat. No. 6,026,741 a baler is shown where the main information is still received from a sensor which is installed on the gearbox of the baler. Although a second sensor is arranged in the bale chamber, the second sensor will only be able to detect when a fresh amount of crop material is in the bale chamber. During the duration of this signal, the signal from the first sensor on the gearbox will be used to determine the force applied on the charge of fresh crop material during compression thereof. However, the same problems as discussed earlier still remain, since the sensor signal used to determine the force is still allocated to the gearbox.

What is needed in the art is a method to process a signal from sensors which will accurately determine the density of the forage material in the bale chamber and to additionally determine the load on the plunger, and to adjust the bale density while the bale is in the bale chamber.

SUMMARY OF THE INVENTION

The present invention provides a method of processing a signal received from sensors placed on the bale chamber and uses the information from the sensors, that detect the deflection of the structural members of the bale chamber, to determine the plunger load and the density of the forming bale.

The invention in one form is directed to a signal processing method of a baler system, the method including the steps of receiving a signal, determining a steady state level and relating the steady state level to a characteristic of a forming bale. The "receiving a signal" step receives a signal from at least one sensor associated with a bale chamber of the baler system. The "determining a steady state level" step determines the steady state level from the signal. The "relating the steady state level to a characteristic of a forming bale" step relates the steady state level of the signal to a characteristic of the forming bale in the bale chamber.

The invention in yet another form is directed to a signal processing method of a baler system, the method including the steps of: receiving a signal from at least one sensor coupled to a structural member of a bale chamber of the baler system; determining a steady state level from the signal and/or a peak value from the signal; and relating either the steady state level to a characteristic of forming bale in the bale chamber or the peak value to a parameter of a plunger in the baler system.

The present invention advantageously estimates the plunger load value and/or the bale density value from a single type of measurement associated with the deflection of components of the bale chamber as detected by the sensors.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention in one form, and such exemplification is not to be construed as limiting the scope of the invention in any manner.

DETAILED DESCRIPTION OF THE INVENTION

Figure 1:
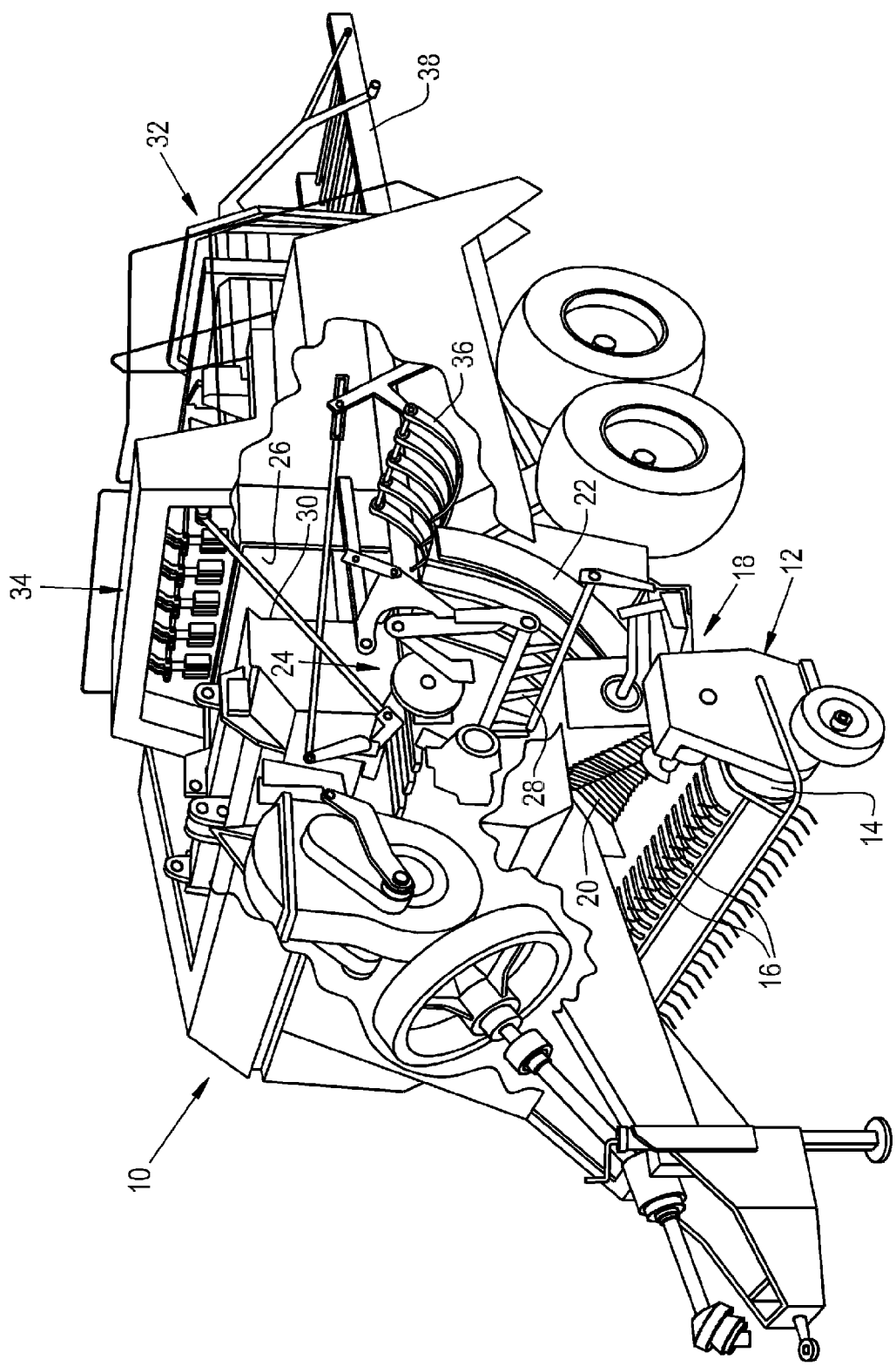
FIG. 1 is a perspective cutaway view showing the internal workings of a large square baler having a bale chamber with a sensor used by an embodiment of a method of the present invention.

Referring now to the drawings, and more particularly to FIG. 1, there is shown an agricultural harvester in the form of a large square baler 10. FIG. 1 is a perspective cutaway view showing the internal workings of a large square baler 10. In the specific embodiment shown, the baler 10 is a New Holland BB960 which is manufactured and sold by the assignee of the present invention.

The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26. The Stuffer unit 24 includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as the second stage for crop compression. When enough flakes have been added and the bale reaches a full (or other predetermined) size, the knotters 34 are actuated which wrap and tie twine around the bale while it is still in the bale chamber 26. Needles 36 bring the lower twine up to the knotters 34 and the tying process then takes place. The twine is cut and the formed baled is ejected from a discharge chute 38 as a new bale is formed.

Figure 2:
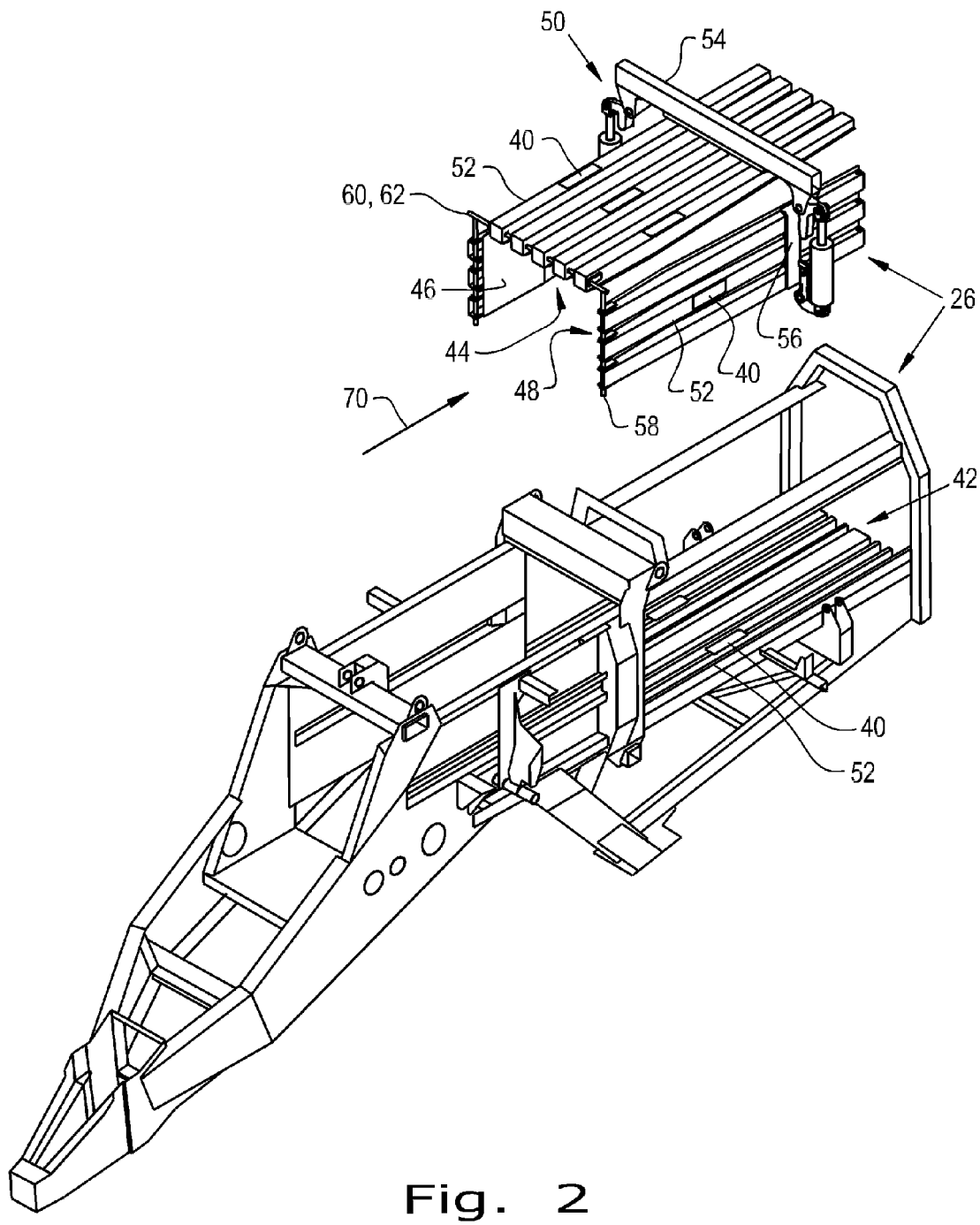
FIG. 2 is a partially exploded view illustrating the bale chamber of FIG. 1.

Referring now to FIG. 2 some framework of the baler system 10 is revealed with the bale chamber 26 illustrated in an exploded view to better illustrate the placement of sensors 40 relative to bale chamber 26. Bale chamber 26 is defined by a floor 42, a ceiling 44 and walls 46 and 48. For purposes of discussion floor 42 will be considered fixed relative to the framework and the ceiling 44 and the walls 46 and 48 are movable by the action of a density ring actuator system 50. The bale chamber 26 has a cross-section that is variable as determined by the density ring actuator system 50. The ceiling 44 and the walls 46 and 48 are shown in FIG. 2 as being expanded out creating an outward taper allowing a bale to easily pass through the bale chamber 26. Under normal use the bale chamber 26 is positioned by the density ring actuator system 50 to be tapered inwardly leading to a reduced cross section as the bale moves through the bale chamber 26. The control of the cross section of the bale chamber 26 leads directly to the control of the density of the bale that is formed in the bale chamber 26, since a more inwardly tapered configuration increases the restriction of travel of the bale.

The floor 42, ceiling 44 and walls 46 and 48 each have at least one structural member 52 extending along a bale forming direction 70. The structural members 52 are what contain the bale and serve to restrict the movement of the bale as it travels through the bale chamber 26. The plunger 30, also referred to as a compressing device 30 is not shown in FIG. 2 for the purpose of clarity. The plunger 30 pushes the wad against the previously formed flakes causing a movement of the forming bale in the bale forming direction 70. This compression of the crop material in the bale is a force that is conveyed by way of the forming bale to the structural members 52. When the plunger 30 retracts there is some rebound of portions of the bale and the now reduced force on the bale is also felt by the structural members 52.

The sensors 40 are positioned on selected structural members 52 to detect an amount of force being conveyed to the structural members 52. This detected force contains information relative to both the load on the plunger 30 as it is compressing the crop material as well as the density of the forming bale. The structural members 52 are held by support members, here illustrated as the support members 54 and 60 holding the structural members 52 associated with the ceiling 44 and the support members 56 and 58 holding the structural members 52 associated with the wall 48. In a like manner the structural members 52 associated with the wall 46 are also constrained. The sensors 40 are shown as being located on the structural members 52 proximate to the midpoint between the respective support members 54, 56, 58 and 60. The sensors 40 are also shown in a plane normal to the bale forming direction 70, although other positions are also contemplated. It is further contemplated that multiple sensors can be placed along the bale chamber 26 to get further information. For example, the supports of the floor 42 are closer together and the sensors are positioned midway between the crossbeams to get maximal effect.

Figure 3:
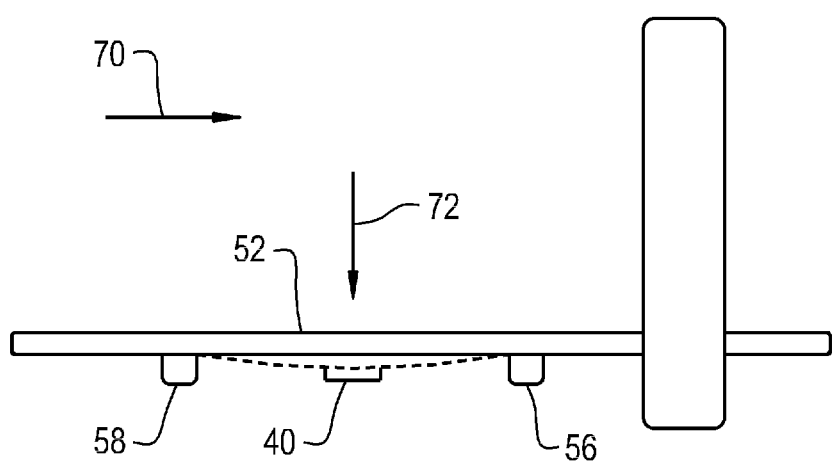
FIG. 3 is a schematical view of a structural member of the bale chamber of FIGS. 1 and 2, illustrating the use of the sensor of the present invention.

Now, additionally referring to FIG. 3 there is illustrated, in a schematical form, the support members 56 and 58 with the structural member 52 extending therebetween and therebeyond. The dashed line illustrates a flexure of the structural member 52, with the sensor 40 being coupled thereto, so as to detect the flexure of the structural member 52 between support members 56 and 58, as the pressure 72 (illustrated by an arrow 72) of the forming bale against the structural member 52 is applied. As the pressure 72 varies the sensor 40 detects the variation of the flexure of the structural member 52 and creates a signal representative of the varying pressure. The information includes a pulsed or variable portion and a slowly varying or steady state portion. The pulsed or variable portion is attributed to the periodic force imparted by the plunger 30 to the forming bale and the steady state portion is attributed to a density of the forming bale. The information is interpreted and acted upon to control the density of the bale formed in the bale chamber 26. The density spoken of here is a relative density. The density is relative since the crop material itself has compressibility characteristics, frictional characteristics as it slides in the bale chamber 26, inherent weight and moisture content, all of which change as the composition of the crop material changes.

The support member 60 is a pivotal connection 62 between the framework of the baler 10 and the structural members 52 that are associated with the ceiling 44. In a similar fashion, the structural members 52 associated with the walls 46 and 48 are pivotally connected to the framework of the baler 10. The structural members 52 of the floor 42 are not pivotally connected to the framework. Regardless, the principle illustrated in FIG. 3 is applicable to all of the structural members 52.

The sensors 40 may be considered to be an array of sensors with the information coming from them producing a three dimensional density distribution as the bale travels in the bale formation direction 70. The sensors 40 may all be identical or it is also contemplated that a variety of sensor types may be utilized. The sensors 40 may take the form of a displacement sensor, a deflection sensor or a strain sensor. A displacement sensor refers to a sensor that detects the displacement of the structural member 52 as it flexes. A deflection sensor refers to a sensor that detects angular movement or the deflection of the structural member 52 as it flexes. A strain sensor refers to a sensor that detects the strain in the structural member 52 as it flexes. The sensors 40 produce the signal reflective of the varying pressure on the structural member 52.

Figure 4:
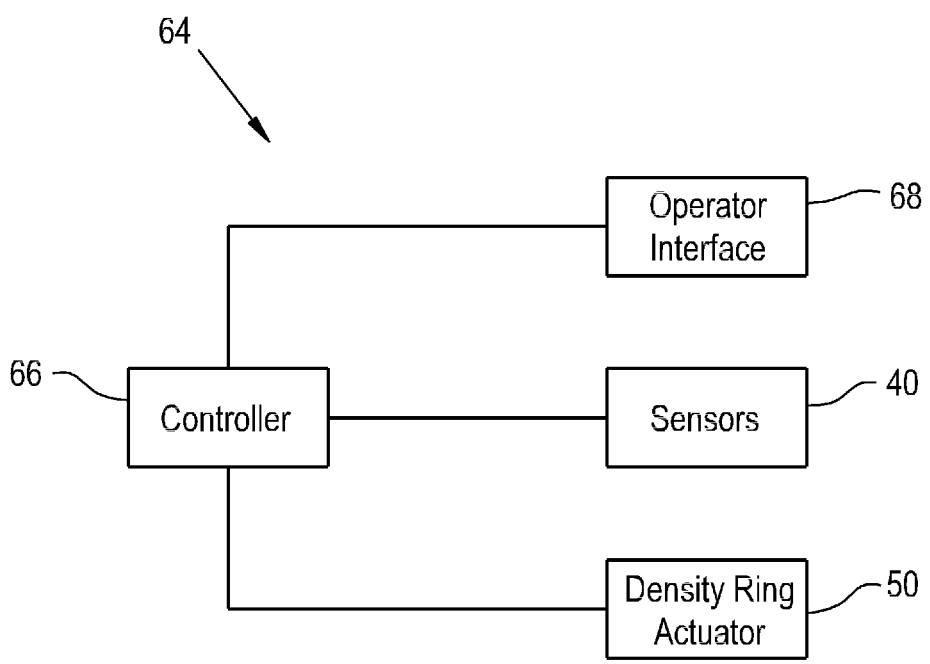
FIG. 4 is a schematical view of an embodiment of a control system of the present invention used in the baler system illustrated in FIGS. 1-3.

Now, additionally referring to FIG. 4 there is illustrated, in a schematical form, a control system 64 having a controller 66 and an operator interface 68. The controller 66 receives signals from sensors 40, with the signals containing the information discussed herein. The information is processed and scaled to reflect the load on the plunger 30 and/or the density of the bale in the bale chamber 26. The controller 66 is in control of the density ring actuator 50 to thereby change the positioning of structural members 52 and thence the density of the bales produced in bale chamber 26. The operator interface 68 receives and displays information from the controller 66 as well as conveys instructions from an operator to the controller 66. The information displayed may include the load on the plunger 30 and/or the density of the bale in the bale chamber 26. The controller 66 is configured to adjust the positioning of the structural members 52 to thereby alter the load on the plunger 30 and/or the density of the bales being formed.

Figure 5:
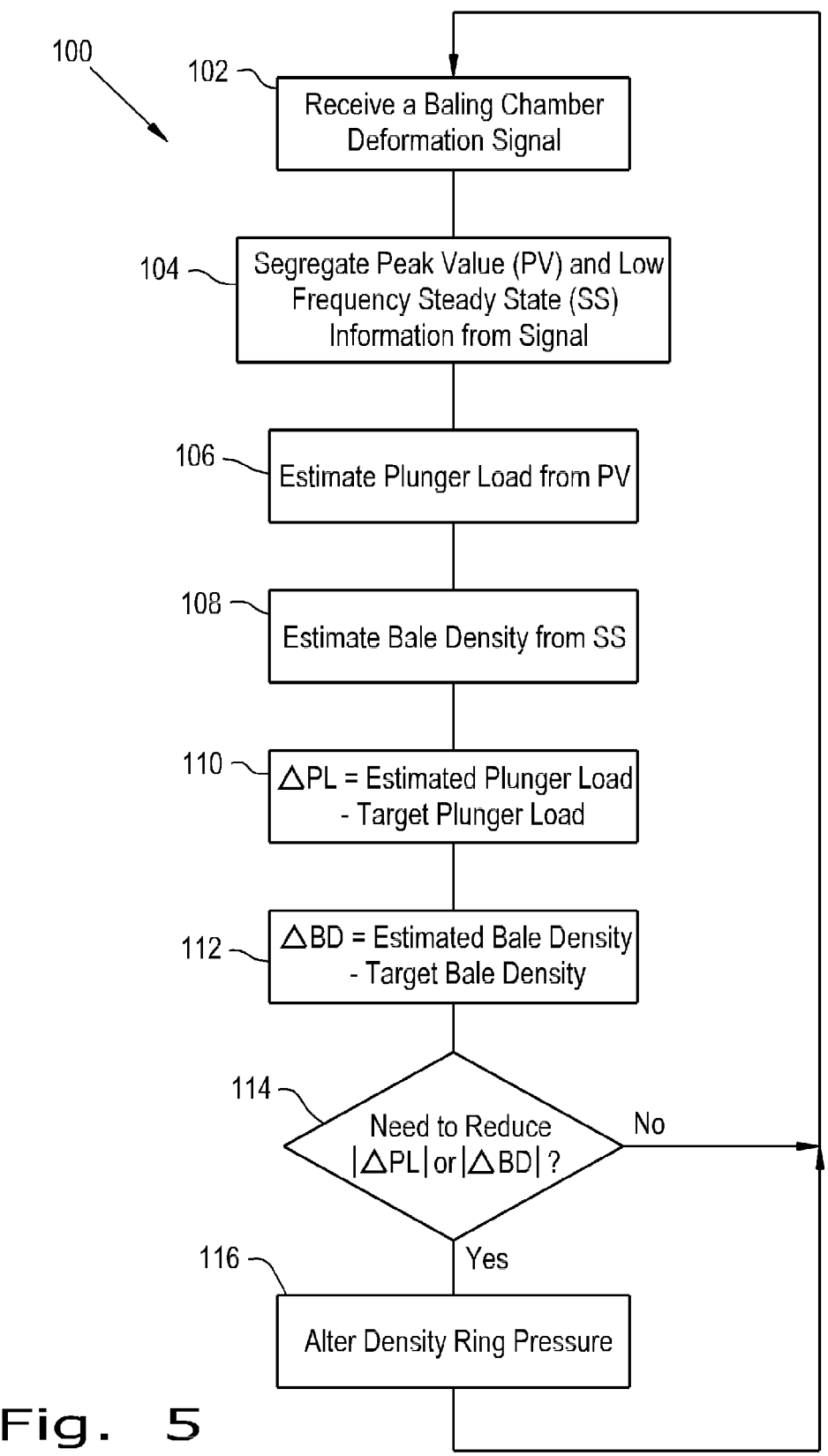
FIG. 5 is a flowchart illustrating an embodiment of a method for processing a signal from a bale chamber sensor of the baler system of FIGS. 1-4.

Now, additionally referring to FIG. 5 there is shown a flowchart illustrating an embodiment of a method 100 for the processing of a signal from a bale chamber sensor. The baling chamber 26 deformation signal from the sensors 40 is received by the controller 66 at step 102. The controller 66 segregates peak value information and steady state information from the signal at step 104 using filtering techniques. The peak value information, referred to as a peak value, is used, at step 106, to estimate the load being experienced by plunger 30, referred to hereafter as the estimated plunger load. The steady state information is used, at step 108, to estimate the density of the forming bale in the bale chamber 26, or at least the pressure under which the forming bale is being compressed in the bale chamber 26, hereafter referred to as an estimated bale density.

A target plunger load value, which may be predefined or input by an operator by way of the operator interface 68 is used as the target value, and at step 110 a delta plunger load is arrived by subtracting the target plunger load value from the estimated plunger load. It is also contemplated that instead of using a target plunger load value that a maximum plunger load value may be used by controller 66 to protect the plunger 30 from be overly stressed by altering the density ring pressure and/or alerting the operator. In addition, or instead of, step 110, a delta bale density value is arrived at by subtracting a target bale density value from the estimated bale density. The target bale density having been supplied to the controller 66 by way of the operator interface 68. A tolerance or acceptable value of the absolute value of the delta plunger load value and/or the delta bale density value is evaluated at step 114 and if the delta values are within the acceptable tolerance, then method 100 returns to step 102. If either of the delta values are outside of the tolerance then the method 100 proceeds to step 116, where density ring actuator 50 is altered to thereby change the effective cross section of bale chamber 26 to alter the resistance to movement of the bale in the bale forming direction 70. If either the plunger load value or the bale density value are too high then the cross section of the bale chamber 26 is made larger, by a predetermined amount, to thereby lower the plunger load value and/or the bale density value. In a like manner if either the plunger load value or the bale density value are too low then the cross section of the bale chamber 26 is made smaller, by a predetermined amount, to thereby lower the plunger load value and/or the bale density value. A predetermined travel distance of the bale may be used before another adjustment of the density ring actuator 50 is undertaken. The estimated plunger load value and the estimated bale density value is displayed on the operator interface 68 by action of the controller 66.

It is also contemplated that information such as the pressure reflected in the hydraulic fluid of the actuators of density ring actuator 50, as a result of the outward pressure of the forming bale, can be used to provide the signal used at step 102. Additionally, the known selected cross-sectional area that is set by the position of the density ring actuator 50 can be used in the bale density calculation process. It is further contemplated to use a weighing system, located at the back of the baler 10, to obtain the weight of the complete bale and to thereby get an absolute density of the bale. This information is then used by the controller 66 in conjunction with the method 100 to control the absolute density of the formed bales.

Advantageously the present invention estimates the plunger load value and/or the bale density value from a single type of measurement associated with the deflection of components of the bale chamber 26 as detected by the sensors 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A signal processing method for a baling system, the baling system comprising a bale chamber having a floor, a ceiling and two walls each having at least one structural member extending a length of the bale chamber along a bale forming direction, and a plunger configured to compress crop material within the bale chamber, the method comprising the steps of:
receiving a signal from at least one sensor positioned on the at least one structural member of the floor, ceiling or wall of the bale chamber of the baler system, the signal representative of flexure of the at least one structural member during formation of a bale in the bale chamber;
determining a steady state level from said signal provided by the at least one sensor positioned on the at least one structural member of the floor, ceiling or wall of the bale chamber of the baler system; and
relating said steady state level to a characteristic of a forming bale in the bale chamber after compression of the crop material by the plunger.

2. The method of claim 1, further comprising the steps of:
determining at least one peak value level from said signal; and
relating said at least one peak value to a parameter of the plunger in the baler system.

3. The method of claim 2, wherein said parameter is a load on said plunger.

4. The method of claim 3, wherein said characteristic is a density of the forming bale.

5. The method of claim 4, further comprising the step of altering a property of said bale chamber dependent upon at least one of said load on said plunger and said density of the forming bale.

6. The method of claim 2, further comprising the step of controlling a density of the forming bale in the bale chamber using at least one of said parameter and said characteristic.

7. The method of claim 6, further comprising the step of displaying at least one of said parameter and said characteristic to an operator of the baler system.

8. The method of claim 6, wherein said step of controlling the density of the forming bale includes the step of altering a setting of a density ring coupled to said bale chamber dependent upon at least one of said parameter and said characteristic.

9. The method of claim 2, wherein said at least one sensor is one of a strain sensor, a deflection sensor and a displacement sensor.

10. The method of claim 9, wherein said at least one sensor is an array of sensors.

11. The method of claim 10, wherein said array is arranged substantially in a plane.

12. The method of claim 11, wherein said signal is a compilation of information from said array of sensors.

13. The method of claim 12, wherein said determining at least one peak value from said signal step includes isolating said at least one peak value from said compilation of information.

14. The method of claim 12, wherein said determining a steady state level from said signal step includes isolating said steady state level from said compilation of information.

15. The method of claim 12, wherein said at least one sensor is an array of sensors, and wherein the array of sensors are all the same type of sensor.

16. A signal processing method of a baler system, the method comprising the steps of:
receiving a signal from at least one sensor positioned on a structural member of a bale chamber of the baler system, the structural member extending a length of the bale chamber, and the signal representative of flexure of the structural member during formation of a bale in the bale chamber;
determining at least one of a steady state level from said signal and a peak value from said signal; and
relating either said steady state level to a characteristic of a forming bale in the bale chamber after compression of crop material by a plunger of the baler system or said peak value to a parameter of the plunger in the baler system.

17. The method of claim 16, wherein both said steady state level and said peak value are determined from said signal; and
both said steady state level is related to a characteristic of the forming bale in the bale chamber and said peak value is related to a parameter of the plunger in the baler system.

18. The method of claim 16, wherein said parameter is a load on said plunger.

19. The method of claim 18, wherein said characteristic is a density of the forming bale.

20. The method of claim 19, further comprising the step of altering a property of said bale chamber dependent upon at least one of said load on said plunger and said density of the forming bale.

* * * * *